May 1, 1951

H. L. HARTMAN 2,551,266

TWO-SPEED FRICTION DRIVE TRANSMISSION
FOR PHONOGRAPH TURNTABLES

Filed Oct. 13, 1948

Herbert L. Hartman,
INVENTOR.

BY Frank M. Slough
and J. H. Slough

May 1, 1951            H. L. HARTMAN            2,551,266
TWO-SPEED FRICTION DRIVE TRANSMISSION
FOR PHONOGRAPH TURNTABLES

Filed Oct. 13, 1948            2 Sheets-Sheet 2

Herbert L. Hartman INVENTOR.
BY Frank M. Slough
and J. H. Slough

Patented May 1, 1951

2,551,266

UNITED STATES PATENT OFFICE 2,551,266

TWO-SPEED FRICTION DRIVE TRANSMISSION FOR PHONOGRAPH TURNTABLES

Herbert L. Hartman, Elyria, Ohio, assignor to The General Industries Company, Elyria, Ohio, a corporation of Ohio Application October 13, 1948, Serial No. 54,315

5 Claims. (Cl. 74—190)

My invention relates to two-speed drives for phonograph turntables and relates more particularly to a transmission mechanism therefor, which may be manually adjusted to frictionally drive a phonograph turntable at either of two widely different rotational speeds.

My present invention involves a mechanism which is of the same general class as that disclosed in my co-pending application for United States Letters Patent, Serial No. 22,348 filed April 21, 1948, now abandoned, which is distinguished from earlier forms of two-speed drives for the same purpose by the fact that such former designs involve the vertical adjustment of a friction type idler wheel thus requiring that the peripheral flange of the turntable, which is engageable at different levels by said wheel, must at least be of double vertical width thereby increasing the cost of the turntable.

An object of my invention is to provide an improved two-speed friction drive mechanism adapted to communicate driving motion to a phonograph turntable whereof an idler wheel, making operative peripheral engagement with the inner surface of a turntable flange, is adapted to be relatively adjusted with respect to alternate driving pulleys so as to communicate motion from either of said pulleys to the turntable to drive said turntable at either of two widely different rotational speeds.

Another object of my invention is to provide an improved two-speed friction drive mechanism for frictionally communicating rotary motion to a pendant turntable flange, from either of two motor driven pulleys which are adapted to rotate at widely different rotational rates, through the same interposed idler wheel without the necessity of vertically adjusting the idler wheel or requiring a plurality of idler wheels.

Another object of my invention is to provide an improved two-speed friction drive mechanism for phonograph turntables having a substantially narrow pendant peripheral flange comprising a pair of driving pulleys, one of which may be rotatable with a motor shaft and the other being driven by said shaft, and a single idler wheel disposed in the same horizontal plane as said pulleys and flange adapted to be interchangeably interposed between said flange and either of said pulleys, said pulleys adapted to drive said wheel at substantially different rotational rates.

Another object of my invention resides in the mechanical arrangement of the elements of my improved mechanism, and the manually operable speed-change means for effecting rotation of the turntable at two widely different rotational speeds.

Other objects of my invention, and the invention itself, will be readily understood by those skilled in the art to which my invention appertains, by reference to the following written description of a preferred embodiment of my invention wherein reference is had to the following drawings, whereof:

Fig. 1 is a top plan view of the dual speed mechanism of my invention, a portion of the turntable flange being shown in cross-section, certain of the operating parts being shown in the position which they assume when the mechanism is set to rotate at 78 R. P. M.;

Fig. 2 is a view similar to Fig. 1, but showing the parts in 33 R. P. M. operating position;

Figure 1:
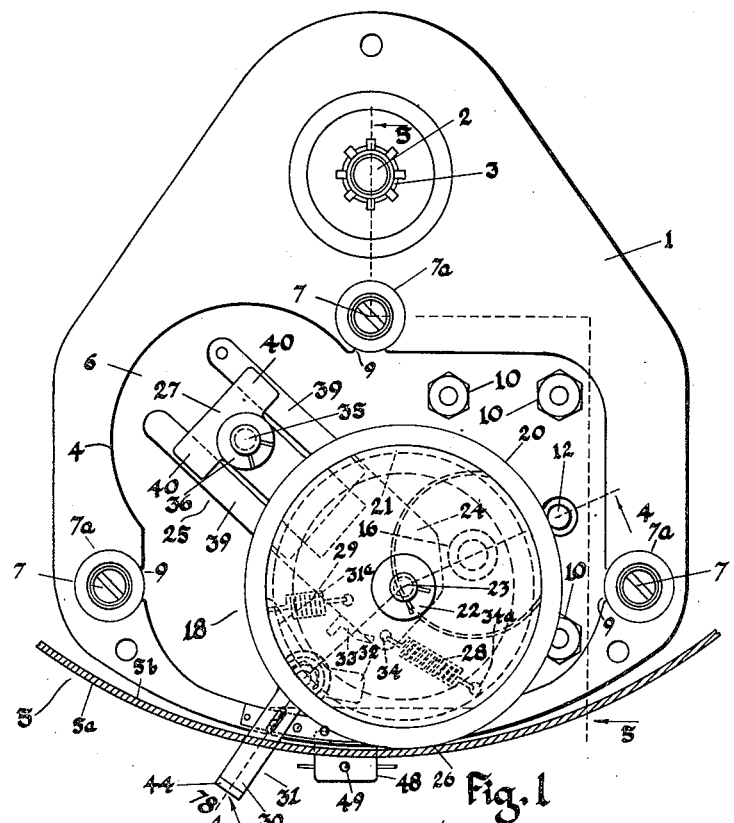

Referring now to the different figures of the drawings, in which like parts are designated by like reference characters, at I I show a horizontally disposed mounting plate, preferably of sheet metal, said plate supporting an upwardly extending rotatable turntable supporting post 2, said post being journalled in bearings carried by the plate at 3, said plate I provided with a large opening 4. A turntable 5 of the now prevalent type is rotatably supported on the post 2, said turntable having a pendant flange 5a the inner surface 5b of which being formed smooth and truly annular being concentric with the axis of the post 2 in accordance with well established practice.

A supplemental plate 6 of preferably the same shape as the opening 4 of the mounting plate I from which it is preferably cut, is pendantly supported from said main plate by machine screws 7 which pass through rubber grommet washers 7a disposed on the upper and lower sides of said main plate through notches 8 of said main plate extending from the opening 4 and which notches are of the same shape as the lateral projections 9 of the supplemental plate 6.

The supplemental plate 6 not only supports the motor M by machine screws 10 and spacing tubes 11, but supports the transmission mechanism from which driving motion for the turntable 5 is derived from the motor shaft 12 which projects upwardly from the motor M through an opening 12a of the said supplemental plate 6. A freely rotatable stepped pulley element 13 is journalled on a post 14 which is secured at its lower end to the supplemental plate and extends vertically therefrom. The element 13 comprises a relatively lowermost and diametrically large pulley 15, and a superposed all metal pulley portion 16 and a base portion 17. An idler wheel 18 of inverted-cup form provides by its pendant annular flange 19 an annular carrier for an annular rubber tread 20 and an interiorly disposed rubber facing 21, said idler wheel being journalled for free rotation about the axis of its hub 22, said hub journalled on an upstanding post 23, said post being affixed by its lower end to an extension 24 of a floating slide plate 25.

Figure 2:
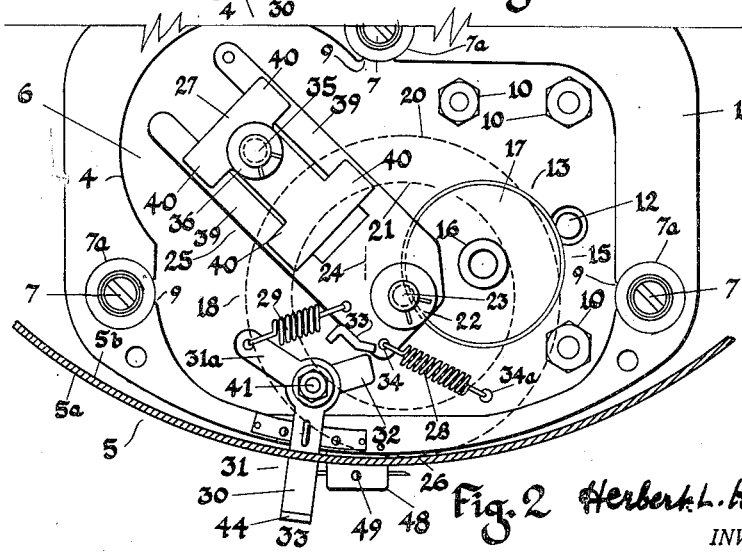

The arrangement of the parts so far identified is such that the upwardly projecting end of the motor shaft 12 is frictionally engaged with the peripherally disposed rubber tread of the large pulley step 15 of the pulley 13 and, in the adjusted position of the described parts as shown in elevation in Fig. 2, the outer rubber tread portion of the idler wheel is in engagement with the inner surface 5b of the turntable flange and the inner rubber facing 21 is in frictionally driven engagement with the small pulley step 16 of the pulley 13.

Thus, as shown in Fig. 2, whereby is illustrated such adjusted position of the slide plate 25 and therefore of the idler wheel 18, the turntable is driven at a predetermined rate of speed such as 33 revolutions per minute by the engagement of the motor shaft 12 with the rubber treaded pulley portion 15 of pulley 13, by the frictional engagement of the smaller metal pulley portion 16 with the inner rubber facing 21 of said idler wheel and by virtue of adjustment means and spring means hereafter described, at the same time, the rubber tread 20 engages the inner surface of the turntable flange 5b.

With the parts as shown in Fig. 2 it may now be stated that as hereinafter described, the slide plate 25 is adapted to be moved from the adjusted position shown in Fig. 2 to a further adjusted position shown in Fig. 1 wherein the inner facing 21 is moved laterally out of engagement with the small step 16 of the pulley 13 and to such a position that the peripheral rubber tread 20 is moved into engagement with the rotary shaft 12 and at the same time, said tread is in engagement at 26 with the inner surface of the turntable flange 5b whereby rotary motion is transmitted directly to the idler wheel 18 from the motor shaft 12 and from said idler wheel by its tread 20 to the turntable flange 15a.

It may be explained that this result is entirely effected by a relatively slight lateral movement of the plate 25 and of the idler wheel 18 which moves with said plate so that when the motor shaft 12 drives the idler wheel 18 by virtue of direct frictional engagement between the motor shaft 12 and the idler wheel tread, the stepped pulley 13, which preferably still being rotated as a result of its engagement with the shaft 12, merely rotates idly and without transmitting rotary movement to the idler wheel whose inner facing is then laterally interspaced from the small step 16 of the pulley 13.

Figure 3:
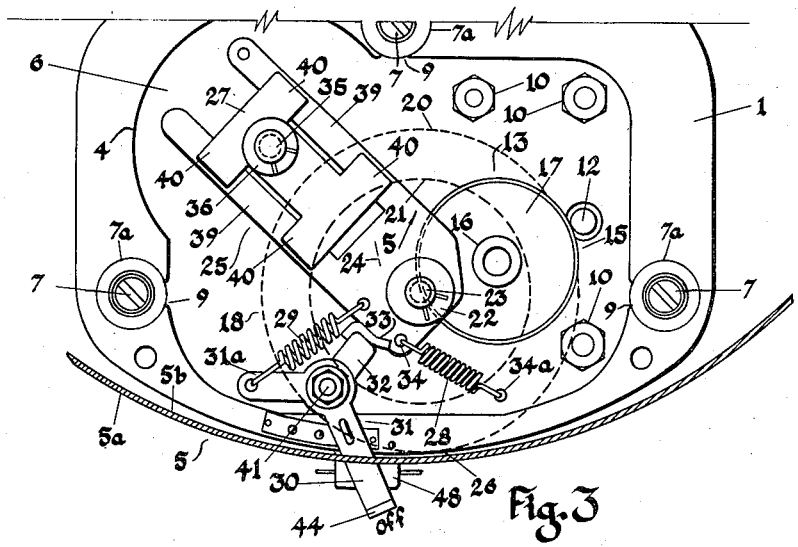
Fig. 3 is a view similar to that of Figs. 1 and 2 but showing the parts in the position which they assume when the mechanism is in its "off" position.
Figure 6:
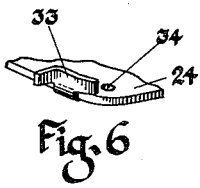
Fig. 6 is a fragmentary perspective view of the cam and associated cam stop of Figs. 1 to 4 inclusive.
Figure 4:
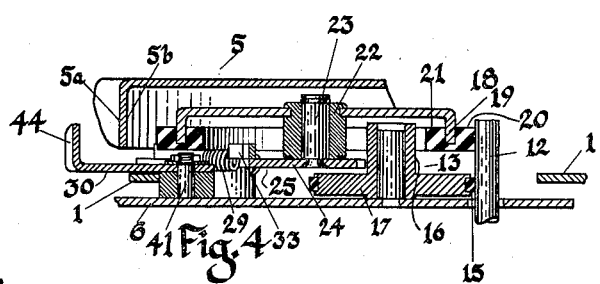
Fig. 4 is a cross-sectional view taken on the line 4—4 of Fig. 1.
Figure 5:
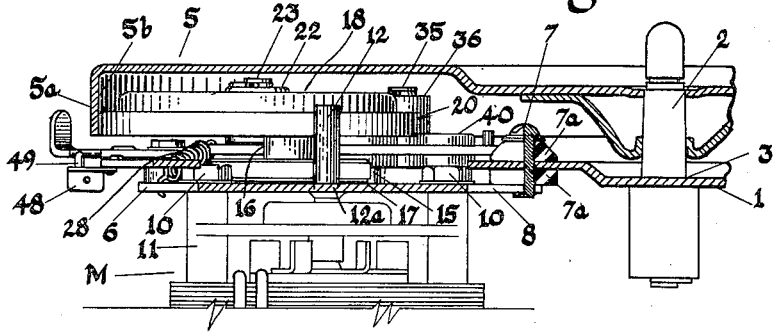
Fig. 5 is a sectional view taken on the line 5—5 of Fig. 1.
Figure 7:
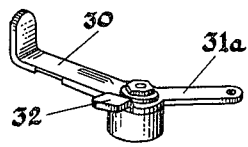
Fig. 7 is a perspective view of the control lever of Figs. 1 to 5 inclusive.

Fig. 3 shows a further adjusted position of the outer surface of the idler wheel tread 20 and the inner surface of the facing 21 of the idler wheel, the outer surface 20 and of the idler wheel being maintained out of engagement with the turntable flange 5b and the inner surface 21 being out of engagement with the pulley 13, the idler wheel being free of engagement with the motor shaft in such position, attained by a further lateral movement of the slide plate 25, the mechanism is set in its "off" or non-rotating position.

Referring now more particularly to Fig. 1 wherein the preferred embodiment of my invention is shown in a top plan view, the view shows the idler wheel slide 25 and slide holder 27 in operative assembled relationship and also shows springs 28 and 29 which act to position the slide 25 which carries the idler wheel in either of the two alternate operative adjustment positions, the tension of the spring 29 being controllable by swinging the handle 30 of the adjustment lever 31 to which the spring 29 is anchored by one of its ends.

The idler wheel slide 25 and the slide holder 27 are of the same type as that shown in my prior Patent No. 2,421,910, dated June 10, 1947, being, however, slightly modified to better adapt it to the illustrated embodiment of my present invention, such modification comprising the upwardly extending slide end 24 to prevent its engaging the pulley 13 and the small slide extension 33 which is adapted for engagement by an extension 32 of the adjustment lever 31 for the purpose of camming the idler wheel supporting slide to give it a neutral adjustment wherein the periphery of the idler wheel 18 will not be engaged with the turntable flange 5a nor with the driving pulley 12 or the small stepped driving pulley 16, whenever the handle is thrown to its indicated "off" neutral position shown in Fig. 3.

The tensile coiled spring 28 is anchored at one end in a small aperture 34a of the supplemental plate and at its other end in an aperture 34 located at one forward corner of the slide which is nearest the turntable flange 5a. The action of the spring 28 tends to extend the slide 25 with respect to the slide holder 27 and the tensile coiled spring 29 exerts little or no deflecting stress on the slide 25 when the lever 31 is in the adjustment position for driving the turntable at 78 R. P. M. to wit, that position wherein the motor pulley 12 is in engagement with the periphery of the idler wheel 18 (Fig. 1); however, when the lever is thrown in the counter-clockwise direction to the indicated 33⅓ R. P. M. position, Fig. 2, the spring 29 exerts a strong force tending to swing the idler carrying end of the slide 25 in the clock-wise direction about the journal 35 of the slide holder 27. It may be said that said holder 27 is provided with a hub 36 which is journalled on to an upstanding post 35 and that said holder is provided with four laterally slotted arms 40 and that the two parallel arms 39 of the slide respectively fitting into oppositely facing pairs of said slots, affords guiding slideways for each of said arms so that the slide may move longitudinally of the holder and the holder being journalled for rotational movement about the post 35 permits the idler wheel carrying end of the slide to be swung about said post.

Except for the lever 31, the action of said lever by increasing the tension pull of the spring 29 upon the slide 25 in the operating position of Fig. 1, the spring 28 exercises a proper resilient pulling force on the slide 25 and in the proper direction to cause the peripheral tread of the idler wheel to simultaneously engage the motor pulley 12 and the turntable flange 5a, and said turntable is therefore driven by said pulley 12 and idler wheel at a rate of 78 R. P. M.

However, when the lever 31 is swung to present its handle 30 to the position marked 33⅓ R. P. M. in Fig. 1, the remote end of the lever which is pivoted at 41 to the supplemental plate 6 exerts a resilient pull upon the slide 25 in such a direction as to withdraw the idler periphery from engagement with the motor roller 12 and to cause the rubber inner facing 21 of the idler to engage the relatively small stepped pulley 16 thereby causing the turntable to be driven by the frictional engagement of the motor pulley 12 with the large stepped pulley 15 then by engagement of the small stepped pulley 16 with the inner facing 21 of the idler wheel, the idler wheel is rotated to frictionally drive the turntable by its peripheral tread at the lowered speed of 33⅓ R. P. M.

The neutral position of the idler wheel is the only adjusted position thereof wherein neither the tread nor the inner facing of the idler wheel flange are in engagement with any other part such as the inner surface 5b of the turntable flange or the outer surface of the relatively small pulley step 16.

Another effect of adjusting the handle 30 of the lever 31 to the neutral or "off" position is to depress the automatic switch button 49 of the electric switch 48 by the effect of superposed engagement of the convexly shaped end 31a of the lever 31 with the upper surface of the switch 48 by the effect of superposed engagement of the convexly shaped end 31a of the lever 31 with the upper surface of the switch button 49 which causes the switch to be operated in a well-known manner to open the electrical circuit leading from the source of electrical power to the electrical motor M. At no other adjustment position of the lever 31 is the switch button depressed, it being spring restored in the usual manner of such switches when the downward pressure upon the button is discontinued by lateral movement of the lever 31 in the clockwise direction.

It is to be noted that the lever extension 32 rigidly holds the idler wheel in its neutral position, free of engagement between its rubber tread and rubber facing surfaces with any other part of the mechanism, and this condition, also prevails at no other adjustment position of the lever.

Diametrical dimensions of the idler wheel rubber tread and facing surfaces and of the pulley steps 15 and 16 of the pulley 13, and of the motor pulley 12, are not herein given, but may be readily ascertained for any given diameter of the inner surface 5b of the turntable flange and the operative rotational speed of the motor shaft 12, and the present drawings are approximately to scale for one embodiment of my invention that has been constructed and successfully operated at the two turntable speeds of approximately 78 R. P. M. and approximately 33⅓ R. P. M.

Having thus described my invention in a single embodiment, it will be apparent to those skilled in the art to which my invention appertains, that numerous and extensive departures may be made from the embodiment herein illustrated and described without departing from the spirit of my invention.

I claim:

1. A two-speed friction drive transmission for phonograph turntables, comprising a motor and motor shaft with the latter extending vertically and affording a friction pulley driving surface, a pendant annular flange for the turntables disposed co-axially thereof, an idler wheel having an annular substantially tubular flange, rubber or like friction facings for the inner and outer wheel flange surfaces, a stepped pulley having relatively superposed pulley surfaces of relatively large lower and small upper portions, its said large portion having a rubber or like peripheral friction surface, said idler wheel adapted to be laterally so positioned with different portions of its said outer facing surface in concurrent engagement with the inner surface of said turntable flange and with said shaft surface, and alternately adapted to be laterally shifted to so laterally position it as to effect concurrent engagement by its outer facing with said turntable flange surface and to cause its inner facing surface to be engaged with the smaller uppermost pulley surface portion of said pulley, said stepped pulley being adapted to peripherally engage by its said friction surface said shaft surface.

2. A two-speed friction drive transmission for phonograph turntables having a pendant annular flange, comprising a motor, a vertical shaft therefor, an idler wheel having a pendant peripheral flange, outer and inner resilient facings for said wheel flange, said outer facing adapted for engagement with a lateral surface of said turntable flange being meanwhile laterally shiftable to either of two laterally different operative positions, and a stepped pulley comprising upper and lower co-axial pulley portions of respectively relatively smaller and larger diameters and the lower pulley portion having an outer tread surface of resilient friction material, said lower pulley surface adapted for engagement with said motor shaft and said wheel tread facing adapted for alternate engagement with said motor shaft according to said alternate laterally adjusted operative positions of said idler wheel, and said upper pulley portion of least diameter adapted to be engaged with the inner facing of said idler wheel flange when the lower pulley portion surface is engaged with said motor shaft.

3. A two-speed friction drive transmission for phonograph turntables having a pendant annular flange, comprising, in combination with said flange, an idler wheel also having a pendant annular flange having inner and outer flange surfaces provided with separate resiliently compressible friction facings, said outer facing adapted for engagement with the inner surface of said turntable flange, and said wheel adapted to be adjusted to alternate positions while so engaged, a motor having a vertically extending motor shaft, a stepped pulley having an upper pulley surface of relatively small diameter and a lower pulley surface of resiliently compressible material which is of relatively larger diameter whose upper pulley surface portion is disposed horizontally within and said shaft end being disposed without the confines of said wheel flange, and adjustment means adapted, when moved in one direction, to laterally shift said wheel to effect engagement thereof by said shaft end, and in the other direction to effect engagement of said upper pulley portions with said shaft and with the inner facing of said wheel flange.

4. The two-speed friction drive mechanism substantially as set forth in claim 3, characterized by the provision of a lateral movable supporting mount for said idler wheel, said mount and said adjustment means being mutually engageable upon movement of said adjustment means to a third position of adjustment to dispose said idler wheel out of engagement with both said motor shaft and said pulley to afford a neutral inoperative position of adjustment for said idler wheel, with respect to said shaft and pulley.

5. The two-speed friction drive mechanism for phonograph turntables substantially as set forth in claim 1, characterized by said pulley and said motor shaft being substantially fixedly journalled in parallelism with the axis of rotation of the turntable, and by the provision of a horizontally shiftable mount upon which said idler wheel is journalled to rotate on a relatively different parallel axis, spring means tending to move said mount laterally in a direction lateral of said wheel axis to affect the recited concurrent engagement of its outer facing surface with both the inner flange surface and with said shaft surface, and by the provision of adjustment means operable to adjustably move said wheel in such a direction as to disengage its outer facing surface from said shaft, and said adjustment means having a more advanced position of adjustment, wherein said mount means is so disposed as to effect disengagement of the outer and inner wheel facings with respectively said shaft and said pulley surfaces, said advanced adjustment position affording an inoperative non-driving position of said idler wheel, with respect to said shaft and said pulley.

HERBERT L. HARTMAN.

REFERENCES CITED

The following references are of record in the file of this patent:

UNITED STATES PATENTS

| Number | Name | Date |
|---|---|---|
| 2,296,751 | Van der Wonde | Sept. 22, 1942 |
| 2,392,193 | Schneider | Jan. 1, 1946 |